(12) United States Patent
Wang et al.

(10) Patent No.: US 12,529,818 B2
(45) Date of Patent: Jan. 20, 2026

(54) RANDOMLY DISTRIBUTED TENSOR RESISTIVITY MEASUREMENT METHOD AND SYSTEM

(71) Applicant: Zhejiang University, Hangzhou (CN)

(72) Inventors: Jiaxin Wang, Hangzhou (CN); Bangbing Wang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 19/220,004

(22) Filed: May 27, 2025

(65) Prior Publication Data
US 2025/0370156 A1    Dec. 4, 2025

(30) Foreign Application Priority Data
May 28, 2024 (CN) .......................... 202410670742.9

(51) Int. Cl.
| | | |
|---|---|---|
| G01V 3/04 | (2006.01) | |
| E21B 47/00 | (2012.01) | |
| E21B 47/06 | (2012.01) | |
| E21B 47/12 | (2012.01) | |
| E21B 47/13 | (2012.01) | |
| G01R 29/12 | (2006.01) | |
| G01V 3/08 | (2006.01) | |
| G01V 3/12 | (2006.01) | |
| G01V 3/28 | (2006.01) | |
| G01V 3/36 | (2006.01) | |
| G01V 3/38 | (2006.01) | |
| G01V 11/00 | (2006.01) | |

(52) U.S. Cl.
CPC ............... *G01V 3/04* (2013.01); *G01R 29/12* (2013.01); *G01V 3/088* (2013.01); *G01V 3/12* (2013.01); *G01V 3/28* (2013.01); *G01V 3/36* (2013.01); *G01V 3/38* (2013.01); *G01V 11/00* (2013.01); *E21B 47/00* (2013.01); *E21B 47/06* (2013.01); *E21B 47/12* (2013.01); *E21B 47/13* (2020.05)

(58) Field of Classification Search
CPC ............ G01V 3/04; G01V 3/088; G01V 3/36; G01V 3/38; G01V 11/00; G01V 3/12; G01V 3/28; G01R 29/12; E21B 47/12; E21B 47/00; E21B 47/06; E21B 47/13
USPC ........................................................ 324/323
See application file for complete search history.

(56) References Cited

U.S. PATENT DOCUMENTS

| | | | | |
|---|---|---|---|---|
| 2003/0071604 A1* | 4/2003 | Lee | .......... | G01R 27/08 324/72.5 |
| 2005/0218914 A1* | 10/2005 | Brabers | ..................... | G01V 3/02 324/694 |

(Continued)

*Primary Examiner* — Raul J Rios Russo (57) ABSTRACT

Disclosed is a randomly distributed tensor resistivity measurement method and system. In the method, electrode deployment can be randomly arranged based on site-specific grounding conditions. The current supply station sequentially energizes two orthogonal current injection channels, while all potential measurement stations simultaneously and in parallel acquire potential differences across two measurement channels. The current and potential difference data are recorded with GPS timestamps, enabling synchronization of current supply and potential measurement station data based on corresponding time. Using the recorded data, current density vectors and electric field intensity vectors are calculated for each supply-measurement station combination, from which the corresponding apparent resistivity tensor is derived.

10 Claims, 7 Drawing Sheets

(56) References Cited

U.S. PATENT DOCUMENTS

| | | | |
|---|---|---|---|
| 2006/0250136 A1* | 11/2006 | Benimeli | G01V 3/20 324/347 |
| 2011/0156709 A1* | 6/2011 | Wang | G01V 3/24 324/366 |
| 2011/0156711 A1* | 6/2011 | Wang | G01V 3/24 324/369 |
| 2017/0248728 A1* | 8/2017 | Fouda | G01V 3/24 |

\* cited by examiner

RANDOMLY DISTRIBUTED TENSOR RESISTIVITY MEASUREMENT METHOD AND SYSTEM

CROSS-REFERENCE TO RELATED APPLICATIONS

This application claims the benefit of priority to Chinese Patent Application No. 202410670742.9, filed on May 28, 2024. The content of the aforementioned application, including any intervening amendments thereto, is incorporated herein by reference.

TECHNICAL FILED

The present invention relates to the field of non-destructive detection and penetrative imaging, and more particularly to a randomly distributed tensor resistivity measurement method and system.

BACKGROUND

Traditional direct current (DC) resistivity methods and their derivative electrical resistivity tomography (ERT) are based on the four-electrode probe technique, which has been widely applied in medicine, industrial process detection, monitoring, and geophysical exploration. The four-electrode probe method utilizes four electrodes: two as current electrodes (A and B) and two as potential electrodes (M and N). The instrument measures the current between the power electrodes and the voltage difference between the potential electrodes simultaneously. Combining these measurements with the spatial configuration of the four electrodes yields an apparent resistivity value, which reflects both the true resistivity of the subsurface medium and the spatial geometry of the electrodes. Through inversion and fitting, the true resistivity distribution of the target object is derived, aiding in the interpretation of internal structure and physical properties.

DC resistivity is a penetrative imaging technique that maps the internal structure of a target by measuring the potential distribution in a steady-state current field. The apparent resistivity value obtained is influenced not only by the true resistivity (including anisotropy) and its spatial distribution but also by the geometric configuration—such as the positions, spacings, and orientations—of the measurement points and electrodes. Parameters including electrode spacing, the distance between the current and potential electrodes, and their orientation significantly affect the apparent resistivity. In addition to the dependence on electrode spacing (which can be mitigated by increasing current to improve signal-to-noise ratio), the apparent resistivity is highly sensitive to direction, resulting in directional variability:

1. When the positions of the current electrodes are fixed and the orientation of the potential electrodes varies, the voltage difference is maximized when the potential electrodes MN are aligned with the gradient direction of the equipotential surface. When MN is parallel to the equipotential surface, the voltage difference approaches zero.
2. When the positions of the potential electrodes are fixed and the orientation of the current electrodes varies, the apparent resistivity value also fluctuates between maximum and minimum values.

These two scenarios demonstrate the directional variability of apparent resistivity obtained using conventional methods, making it difficult to establish a one-to-one correspondence with the true subsurface resistivity. This greatly affects the accuracy of resistivity imaging. In two-dimensional electrical resistivity tomography (ERT), the current and potential electrodes are collinear and aligned with the direction of maximum voltage gradient, effectively capturing the potential distribution within the measurement plane. Thus, electrode orientation is not a concern. However, in three-dimensional resistivity exploration, current electrodes AB and potential electrodes MN may be deployed at arbitrary positions and orientations. Variations in orientation affect the apparent resistivity and, in turn, significantly influence inversion results. Consequently, inverting directionally variable apparent resistivity to determine the true resistivity, which is inherently unique, leads to substantial uncertainty and incompleteness, hindering accurate and comprehensive characterization of the subsurface electric field.

In summary, the four-electrode probe method exhibits the following inherent disadvantages:

1. Uncertainty and incompleteness in scalar resistivity measurement methods: In single-component measurements, the apparent resistivity varies with direction, and the direction of maximum value is unknown. Data acquisition and survey design suffer from subjectivity and incompleteness. The resulting single-channel apparent resistivity values do not fully describe the actual surface electric field characteristics. These limitations are especially pronounced in three-dimensional measurements.
2. Vulnerability of single-component voltage measurements to interference due to blind electrode placement: Electrode deployment without directional consideration may result in potential electrodes being aligned along equipotential surfaces, where the measured voltage difference approaches zero. When the geometric factor K is large, the measured voltage difference becomes minimal, making the apparent resistivity highly susceptible to instrument stability and external electromagnetic interference, resulting in abrupt or erroneous values.

Although the development from four-probe resistivity methods to electrical resistivity tomography (ERT) has increased data density and imaging resolution through multichannel measurements, the fundamental deficiencies of the four-electrode probe remain, while new issues have emerged:

1. Signal coupling due to shared channels in electrical resistivity tomography (ERT) systems: Shared current supply and voltage measurement channels in multi-core cables may cause coupling between signals, leading to serious interference in secondary field measurements of induced polarization. Multi-core cables are also unsuitable for strong-current supply, limiting their applicability in deep or long-duration surveys.
2. Pseudo-three-dimensional nature of conventional electrical resistivity tomography (ERT) surveys: ERT inherit the uncertainty and incompleteness of the four-probe method. Electrodes are arranged on a regular grid, progressing along two orthogonal directions, yielding pseudo-3D data rather than true 3D exploration. In urban or complex environments, finding suitable, regularly shaped deployment areas is difficult, severely restricting field applications.
3. Low acquisition efficiency due to serial measurement and heavy cabling: Existing systems use long cables to connect all electrodes, and measurements are performed serially by selecting four electrodes based on their positions along the cable. This results in low efficiency. The heavy cables increase labor intensity, and obstacles such as rivers, buildings, and roads make deployment difficult.

4. Limited survey area and complexity in rolling acquisition: The number of electrodes, electrode spacing, and cable length limit traditional 3D electrical resistivity tomography (ERT) systems to small areas, requiring multiple rolling acquisitions to cover a full 3D survey area. This process is extremely complex and often infeasible under challenging surface conditions.
5. Inadequacy for deep exploration: Due to electrode spacing and total electrode number limitations, traditional electrical resistivity tomography is generally suitable for shallow investigations above 50 meters, and cannot meet the needs of deep exploration ranging from hundreds to thousands of meters, such as in mineral prospecting or geothermal investigations.
6. Limited measurement parameters hinder applications in mineral exploration: Each electrode must function as both a current and a potential electrode, complicating self-potential and induced polarization measurements, and severely restricting electrical resistivity tomography in mineral exploration.

SUMMARY

In view of the deficiencies in the prior art, the present invention provides a randomly distributed tensor resistivity measurement method and system. Specifically:

A randomly distributed tensor resistivity measurement method includes the following steps:

S1: According to surface conditions, a plurality of potential measurement stations P are randomly arranged within the survey area to cover the entire survey region;

S2: Four potential electrodes M1, N1, M2, and N2 are arranged around each potential measurement station P. A potential measurement unit is installed at each station P. The line connecting M1 and N1 intersects the line connecting M2 and N2. The distances between M1 and N1, and between M2 and N2, are defined as electrode spacing a, where a=($1/10$-$1/20$) H, and H represents the exploration depth;

S3: Multiple current injection points are deployed within the survey area. Four current electrodes A1, B1, A2, and B2 are selected, such that the line connecting A1 and B1 intersects the line connecting A2 and B2;

S4: Power is supplied to electrodes A1 and B1 by a current station, while all potential measurement stations P simultaneously perform potential measurements. The current station records the supply current $I_1$ at A1 and B1. Each potential station measures the potential differences $$\Delta U^{(1)}_{M1N1} \text{ and } \Delta U^{(1)}_{M2N2}$$

across electrode pairs M1-N1 and M2-N2, respectively, corresponding to current injection at A1 and B1. Subsequently, power is supplied to electrodes A2 and B2, and all potential measurement stations P simultaneously perform potential measurement. The current station records the supply current $I_2$ at A2 and B2. Each potential station measures the potential differences $$\Delta U^{(2)}_{M1N1} \text{ and } \Delta U^{(2)}_{M2N2}$$

across electrode pairs M1-N1 and M2-N2, respectively, corresponding to current injection at A2 and B2;

S5: Based on the supply currents $I_1$ and $I_2$, and the spatial relationships between A1, B1, and point P, a first current density vector (generated by A1 and B1 at P) and a second current density vector (generated by A2 and B2 at P) are obtained. Using $$\Delta U^{(1)}_{M1N1} \text{ and } \Delta U^{(1)}_{M2N2}$$

along with the electrode spacing, the first electric field intensity vector generated by A1 and B1 at point P is derived. Using $$\Delta U^{(2)}_{M1N1} \text{ and } \Delta U^{(2)}_{M2N2}$$

along with the electrode spacing, the second electric field intensity vector generated by A2 and B2 at point P is derived;

S6: The first and second current density vectors and the first and second electric field intensity vectors are decomposed within a common coordinate system to calculate the apparent resistivity tensor.

Furthermore, the method includes: prior to executing step S1, dividing the entire survey area into a plurality of sub-areas. Steps S1 through S6 are then executed within each sub-area to complete tensor resistivity measurements for each sub-area, thereby completing the tensor resistivity measurement of the entire survey area.

Furthermore, the method comprises: prior to executing step S1, dividing the entire survey area into a plurality of sub-survey areas, and then executing steps S1 through S2 within each sub-survey area to arrange potential measurement stations P and potential electrodes M1, N1, M2, and N2 therein.

The current electrode arrangement and selection in step S3 is replaced as follows: within each sub-survey area, k internal current electrodes are arranged, and 1 external current electrodes are arranged around the periphery of each sub-survey area. One internal current electrode is selected from the k internal current electrodes and designated as point O. Two electrodes are randomly selected from the l external current electrodes and designated as A1 and A2, such that B1 and B2 both coincide with point O;

Steps S4 through S6 are then executed within each sub-survey area to complete the tensor resistivity measurement for that sub-area, thereby completing the tensor resistivity measurement for the entire survey area.

Furthermore, prior to executing step S1, the entire survey area is divided into a plurality of sub-survey areas, and within each sub-survey area, steps S1 through S2 are carried out to arrange potential measurement stations P and potential electrodes M1, N1, M2, and N2;

The current electrode arrangement and selection in step S3 is replaced as follows: not fewer than four external current electrodes are arranged around the periphery of each sub-survey area. Any four external electrodes are selected and designated as A1, B1, A2, and B2, such that the line connecting A1 and B1 intersects the line connecting A2 and B2;

Steps S4 through S6 are then executed within each sub-survey area to complete the tensor resistivity measurement for that sub-area, thereby completing the tensor resistivity measurement for the entire survey area.

Furthermore, the external current electrodes arranged around each sub-survey area are distributed in various directions around the sub-survey area.

Furthermore, eight external current electrodes are arranged around each sub-survey area, and are distributed in the east, west, south, north, southwest, northwest, southeast, and northeast directions.

Furthermore, in step S2, the potential electrodes N1 and N2 coincide with the potential measurement station P.

Furthermore, the current electrodes B1 and B2 coincide as point O, and the current supply station is arranged at point O.

Furthermore, the spacing between adjacent potential measurement stations is 2 to 3 times the electrode spacing, and the distance between adjacent current injection points is 3 to 5 times the spacing between adjacent potential measurement stations.

A randomly distributed tensor resistivity measurement system, including a plurality of current supply stations and potential measurement stations.

The current supply station includes a supply station host, long-distance power cables, current electrodes, and a boost power supply.

The supply station host includes a first control module, a first power module, a first built-in battery, a current measurement module, and a first GPS module. The first control module is configured to control electrode channel selection, supply parameter settings, integration of the external boost power supply, internal power management, current measurement during supply, GPS timing, and synchronization of measured current data with time, forming time-series current data and segmenting the data at preset intervals for storage.

The current measurement module digitizes the current values through an analog-to-digital conversion (A/D) circuit.

The first power module is configured to select a specific power channel and connect to the boost power supply via the power interface.

The first built-in battery supplies long-term operating power to the current supply station.

The first GPS module, comprising an external antenna, is controlled by the first control module and continuously transmits GPS codes to the supply station host after successful startup self-check, providing position and timing information.

The supply station host provides four power output ports, which are connected to current electrodes located at points A1, B1, A2, and B2 through the long-distance power cables, sequentially supplying power to the subsurface.

The potential measurement station comprises a potential measurement station host, potential measurement cables, and potential measurement electrodes.

The potential measurement station host comprises a second control module, a second power module, a second built-in battery, a potential measurement module, and a second GPS module.

The second control module is configured to control electrode channel selection for potential difference measurement, set potential measurement parameters, manage internal power, perform dual-channel potential difference measurements and storage, synchronize GPS timing with the potential difference data to form time-series potential difference data, and segment and store the data at preset intervals.

The potential measurement module is configured to simultaneously acquire potential difference data from two orthogonally arranged potential measurement channels.

The second power module is responsible for monitoring the status of the built-in battery and managing the charging process;

The second built-in battery supplies long-term operating power to the potential measurement station.

The second GPS module, comprising an external antenna, is controlled by the second control module and continuously transmits GPS codes to the second control module after successful startup self-check, providing measurement station location and timing information.

The potential measurement station host provides four potential measurement ports, which are connected to potential measurement electrodes located at M1, N1, M2, and N2 via potential measurement cables, for receiving potential difference information between electrode points.

The advantages of the present invention are as follows:
1. The method adopts a randomly distributed acquisition station layout. The locations of current supply and potential measurement points can be flexibly arranged based on surface conditions, avoiding restrictions imposed by unfavorable terrains and improving the flexibility of field deployment. The derived resistivity tensor can be used in inversion to achieve true 3D and 4D resistivity imaging of the survey area.
2. By employing time-division, multi-directional sequential current injection and simultaneous group acquisition, potential difference data in cross-directions can be obtained, providing comprehensive geoelectric field distribution information. Utilizing a one-transmit-multiple-receive and multi-point sequential excitation model synchronized via GPS timing enables automated, parallel group measurements and improves data acquisition efficiency.
3. The randomly distributed tensor resistivity measurement system features independently designed supply and potential measurement hosts. Each node operates autonomously. Separation of power and potential measurement cables avoids coupling interference, enabling multi-parameter measurements such as resistivity, induced polarization, and self-potential.
4. The method and system can flexibly adjust acquisition parameters according to exploration requirements, making it suitable for both shallow-to-medium-depth 3D resistivity exploration and deep investigations such as mineral prospecting and geothermal surveys.

DETAILED DESCRIPTION OF THE EMBODIMENTS

The invention will now be described in detail with reference to the accompanying drawings and preferred embodiments. The objectives and advantages of the invention will become more apparent. It should be understood that the specific embodiments described herein are merely illustrative and are not intended to limit the scope of the invention.

In practical electrical exploration, the resistivity ρ, which is the reciprocal of conductivity, is commonly used to describe the electrical properties of a medium. At the ground surface interface, the vertical components of the current density and electric field intensity in Ohm's Law become zero, and the resistivity tensor degenerates into a 2×2 matrix. This can be expressed and calculated by instrumentation as:

$$\vec{E} = \overline{\overline{\rho}} \cdot \vec{J}$$

In inhomogeneous or anisotropic media, the directions of the electric field intensity vector $\vec{E}$ and the current density vector $\vec{J}$ are no longer aligned, resulting in an angle between them. For configurations involving dual current injection and dual potential difference measurements, the electric field intensity vector $\vec{E}$ and corresponding current density vector $\vec{J}$ can be obtained by measuring the potential differences generated by two distinct current fields. The apparent resistivity tensor p is then calculated, and inversion methods are used to derive the true resistivity tensor of the subsurface medium.

Figure 1:
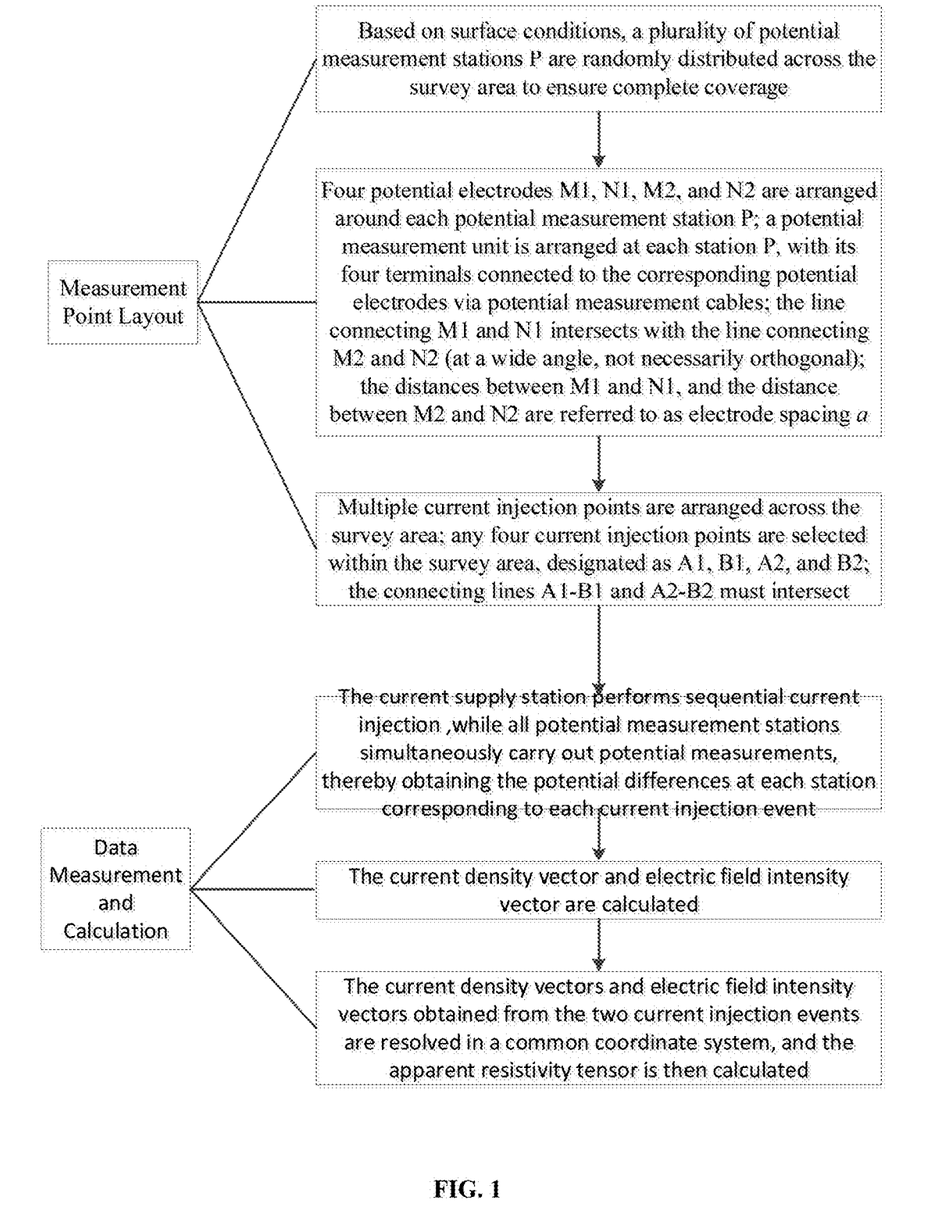
FIG. 1 is a flowchart illustrating the randomly distributed tensor resistivity measurement method of the present invention.

As illustrated in FIG. 1, this embodiment of the randomly distributed tensor resistivity measurement method includes two major components: (I) measurement point design and layout including the following steps S1-S3, and (II) data acquisition process and procedures including the following steps S4-S6.

I. Measurement Point Design and Layout

A key feature and advantage of the randomly distributed tensor resistivity method is that the current supply and potential measurement units are independently and separately designed. Each unit autonomously manages its own data acquisition, while the entire system enables coordinated, multi-station operation. Both the current supply and potential measurement stations adopt dual-channel, node-based acquisition designs using either three or four electrodes, allowing for flexible layout according to terrain conditions. The system imposes no specific restrictions on electrode pair positioning or orientation; however, uniform distribution within the survey area is encouraged for consistent subsurface coverage. The acquisition parameters, including potential electrode spacing, current electrode spacing, and point density, are determined based on the target exploration depth. The potential and current electrode points are then planned and laid out on a map. The specific measurement point design steps are as follows:

S1: Based on surface conditions, a plurality of potential measurement stations P are randomly distributed across the survey area to ensure complete coverage. The spacing between adjacent potential measurement stations is set to 2-3 times the electrode spacing.

S2: Four potential electrodes M1, N1, M2, and N2 are arranged around each potential measurement station P. A potential measurement unit is arranged at each station P, with its four terminals connected to the corresponding potential electrodes via potential measurement cables. The line connecting M1 and N1 intersects with the line connecting M2 and N2 (at a wide angle, not necessarily orthogonal). The distances between M1 and N1, and the distance between M2 and N2 are referred to as electrode spacing α (not required to be equal, with the specific length determined by coordinate positioning). Specifically, α=(1/10~1/20) H, where H is the exploration depth.

S3: Multiple current injection points are arranged across the survey area, with the spacing between adjacent current injection points being 3-5 times that between adjacent potential measurement stations P. Any four current injection points are selected within the survey area (specific injection configurations and selection methods are detailed later), designated as A1, B1, A2, and B2. The connecting lines A1-B1 and A2-B2 must intersect. Electrodes at A1, B1, A2, and B2 are connected to the current supply station via long-distance power cables.

Figure 2:
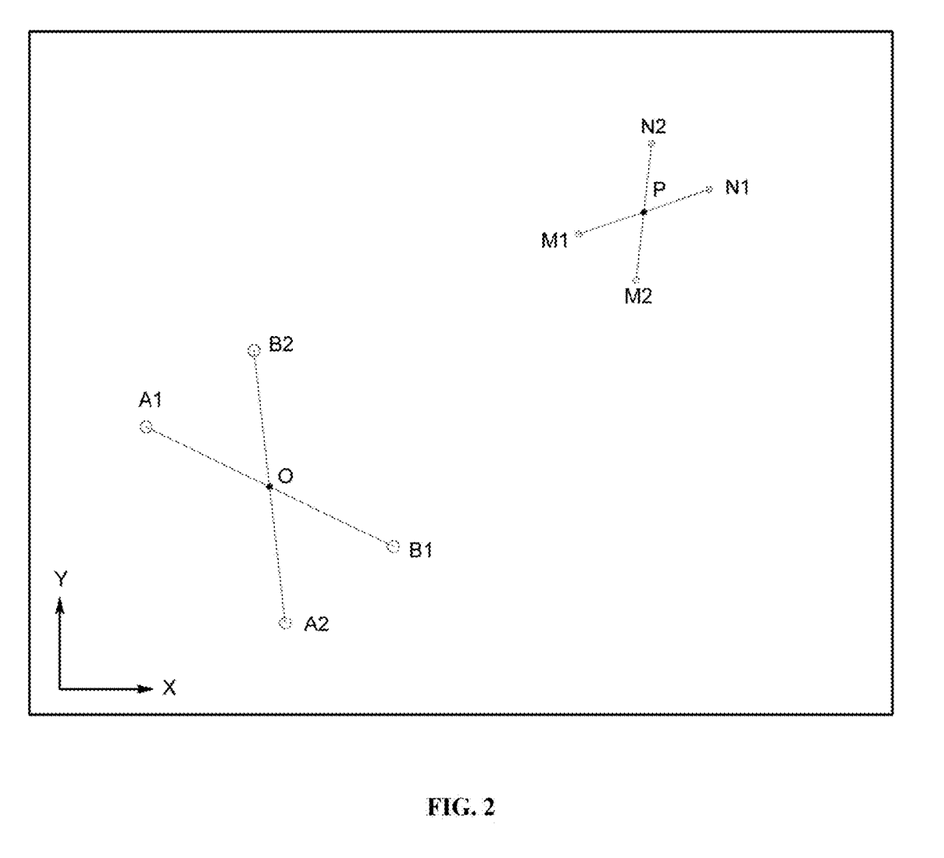
FIG. 2 is a schematic diagram showing the relationship between current injection electrodes and potential measurement electrodes in tensor resistivity measurement.

The relationship between current injection electrodes and potential measurement electrodes for tensor resistivity measurement is illustrated in FIG. 2.

Figure 3:
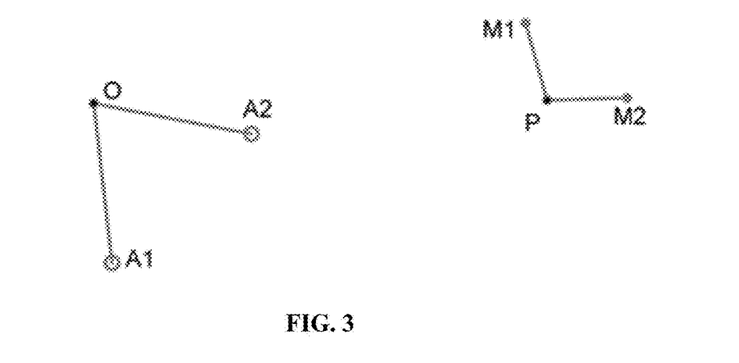
FIG. 3 is another schematic diagram showing an alternative layout of current injection and potential measurement electrodes for tensor resistivity measurement.

To facilitate field deployment and improve operational efficiency, the current injection points B1 and B2 may be co-located at a single point, designated as point O, where the current supply station is arranged. For similar reasons, the potential measurement electrodes N1 and N2 may be co-located with the potential measurement station P. The layout shown in FIG. 3 is more conducive to practical field implementation.

Figure 4:
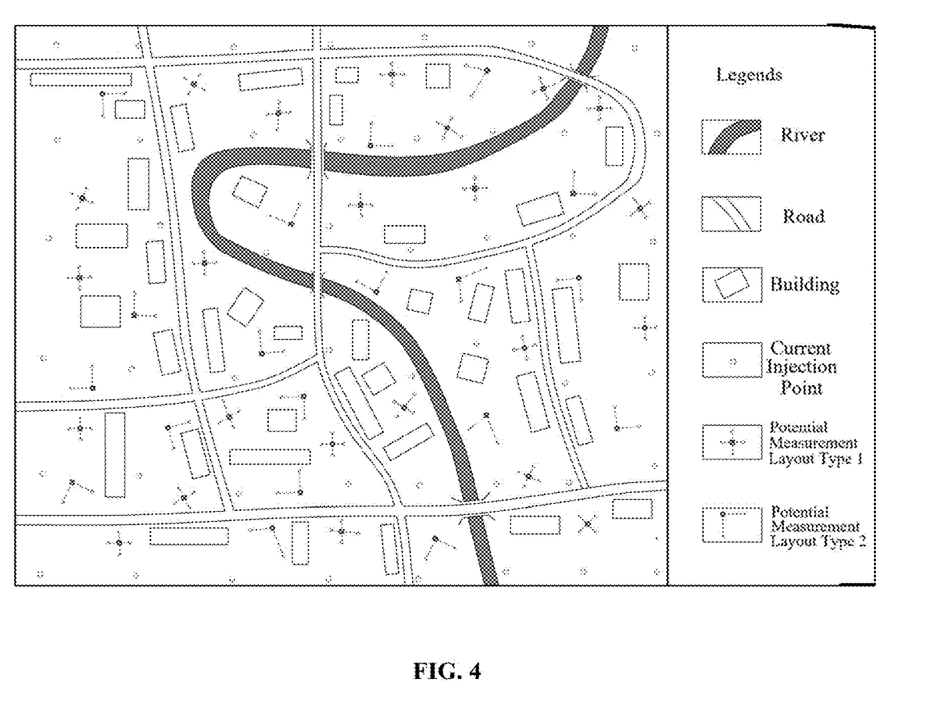
FIG. 4 is a schematic diagram illustrating the layout effect of measurement points in a randomly distributed tensor resistivity measurement.

In one exemplary embodiment, a mixed layout scheme for current injection and potential measurement electrode deployment is illustrated in FIG. 4, demonstrating the effectiveness of the arrangement.

In practice, to achieve inversion imaging at greater exploration depths, the distance between current injection points and potential measurement stations should increase proportionally with the target depth. Due to limitations on the number of available current and potential measurement instruments, it is typically impractical to cover the entire survey area with instruments in a single deployment. To achieve comprehensive and relatively uniform imaging coverage of the survey area, the area is first subdivided into multiple sub-survey zones. Current injection points and potential measurement stations are arranged and deployed within each sub-zone. After completing the measurements in one sub-zone, the system rolls forward sequentially to the next sub-zone and repeats steps S1-S2, continuing until data acquisition is complete in the final sub-zone, thereby finalizing the data collection for the entire survey area.

During actual field operations, the deployment process includes both paper-based planning and on-site validation. Once the measurement locations are finalized, GPS or similar surveying equipment is used to record the coordinates and identifiers of each electrode pair. These data support subsequent optimization of the acquisition plan and configuration of instrument parameters during field implementation.

Furthermore, various flexible approaches are available for the deployment and powering strategies of current injection points in Step S3:

1. Quasi-Equidistant Grid Node Powering Mode

Figure 5:
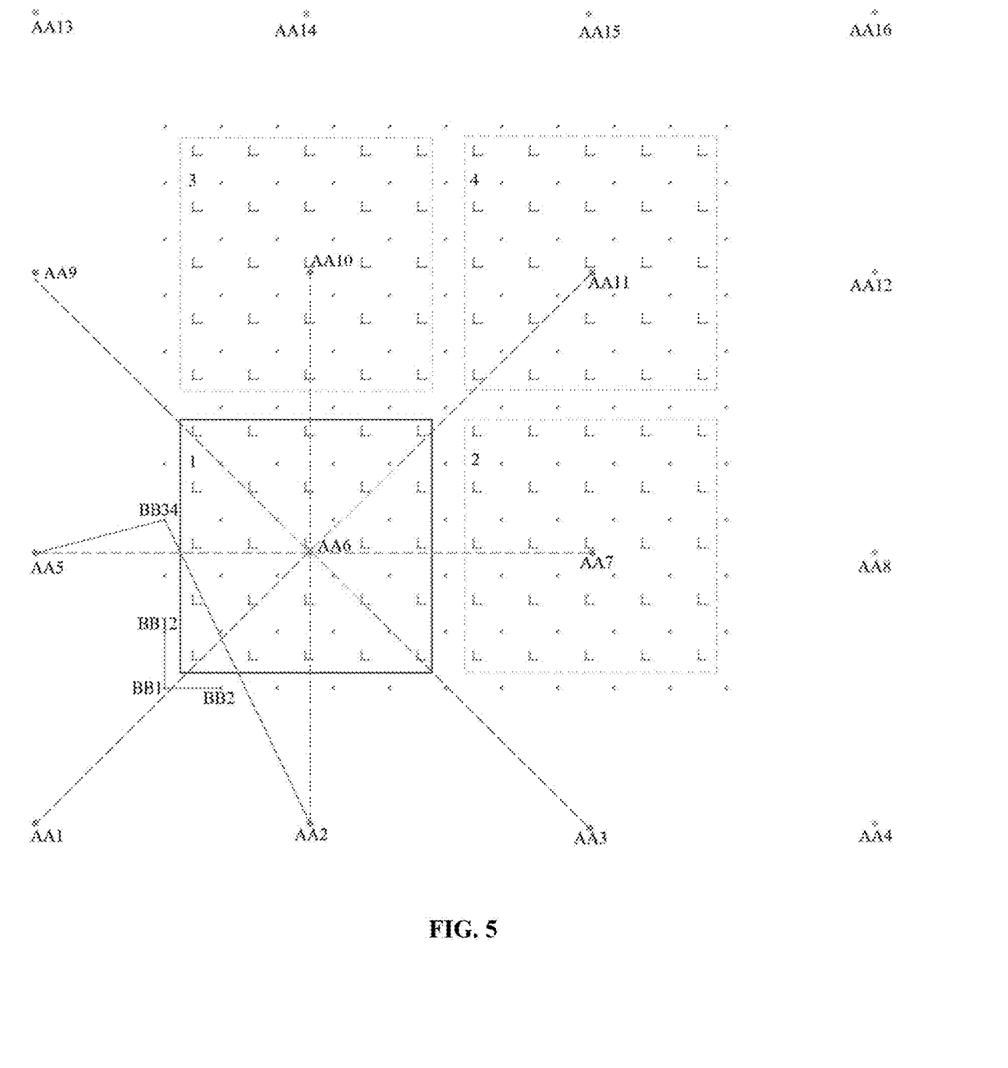
FIG. 5 is a schematic diagram showing rolling measurements within tensor resistivity sub-survey areas.

A grid of designed current injection points is used to form near-orthogonal powering combinations (e.g., BB1-BB2 and B1-BB12 in FIG. 5). The advantage of this mode is that the system can advance sequentially along orthogonal directions defined by the grid layout, and the power cables remain relatively short, which is beneficial for field deployment. However, due to the short spacing between injection points, mutual electromagnetic interference is more likely during measurements. To mitigate this, higher supply voltage is applied to increase current magnitude, or the dipole length is increased by using every few points as power electrodes.

2. Peripheral Illumination Imaging Powering Mode

In this mode, l external current injection points are arranged around each sub-survey area. From l external current injection pints, any four points are selected and designated as A1, A2, B1, and B2, which serves as the current supply station combination (the lines A1-B1 and A2-B2 intersect at point O). As illustrated in FIG. 5, the survey area is divided into four square sub-areas, with small red dots representing current injection points. Taking sub-area 1 at lower-left quadrant as an example, it includes 8 peripheral long-distance current injection points and 25 potential measurement stations. The 8 peripheral injection points are labeled as AA1 through AA3, AA5, AA7, and AA9 through AA11, and are distributed around the east, west, south, north, southwest, northwest, southeast, and northeast directions. For example, AA5 and AA7 can be selected as A1 and B1, and AA2 and AA10 as A2 and B2. Alternatively, AA9 and AA2 can serve as A1 and B1, and AA2 and AA11 as A2 and B2. For any selected power combination, all potential measurement stations (both M1-N1 and M2-N2 channels) in the sub-area perform simultaneous, parallel measurements. This powering mode minimizes field workload.

3. Hybrid Near-Far Powering Mode

As shown in FIG. 5, the entire survey area is divided into four square sub-survey areas. Sub-area 1 includes 36 internal current electrodes, 8 peripheral long-distance injection points, and 25 potential measurement stations. In this mode, combinations of long-distance illumination points (AA-type) and internal short-distance points (BB-type) are used for powering. Specifically, k internal current injection points are arranged within each sub-area, and l external points around the perimeter. One internal point is selected and labeled as point O. Two external points are selected and labeled A1 and A2, with B1 and B2 coinciding at O. In the configuration illustrated in FIG. 5, a combination such as AA5, BB34 and AA2, BB34 is used. Numerous AA-BB combinations are available, enabling multi-directional "illumination" of the underground target, improving measurement density and resolution. For example, the system can begin with (AA1:BB1) and (AA2:BB1), then sequentially move through (AA1:BB2) and (AA2:BB2) up to (AA1:BB61) and (AA2:BB61). Next, based on combinatorial patterns, configurations like (AA2:BB1) and (AA3:BB1) are selected. This iterative sequence continues until all combinations of AA- and BB-type points are exhausted, thereby completing the powering phase. During this process, the two powering channels are activated sequentially, while all 25 potential measurement stations simultaneously collect voltage data for each supply event. After completing the measurement for sub-area 1, all supply and potential measurement stations are relocated to sub-area 2. The powering and measurement process is then repeated. The same procedure is followed sequentially in sub-areas 3 and 4 until all data acquisition tasks for the full survey area are completed.

By deploying the current injection points beyond the periphery of each sub-survey area, not only is multi-directional "illumination" imaging enabled, but the electrode spacing for current injection is also extended. This increases the effective exploration depth and ensures that near-, mid-, and far-depth regions each have sufficient coverage from measurement points.

Therefore, the measurement point design and deployment in this embodiment may alternatively be structured as follows:

Prior to executing step S1, the entire survey area is divided into multiple sub-survey areas. Within each sub-survey area, the complete randomly distributed tensor resistivity measurement method is implemented. After completing the tensor resistivity measurement in each sub-area, the process is considered complete for the entire survey area.

Alternatively, prior to executing step S1, the survey area is divided into multiple sub-survey areas. Then, within each sub-area, steps S1 and S2 are carried out to deploy potential measurement stations P and corresponding potential electrodes M1, N1, M2, and N2;

The current electrode arrangement and selection in step S3 is modified as follows: k internal current injection points are deployed within each sub-survey area, and l external current injection points are arranged around the perimeter. One of the internal injection points is selected as point O. Two external injection points are selected and designated as A1 and A2, such that B1 and B2 are both co-located with point O.

Alternatively, prior to executing step S1, the entire survey area is divided into multiple sub-survey areas. Within each sub-area, steps S1 and S2 are performed to deploy potential measurement stations P and corresponding potential electrodes M1, N1, M2, and N2;

The current electrode arrangement and selection in step S3 is modified as follows: not fewer than four external current injection points are deployed around the perimeter of each sub-survey area. From these, any four are selected and designated as A1, B1, A2, and B2, such that the line connecting A1 and B1 intersects the line connecting A2 and B2.

II. Data Acquisition Process and Acquisition Steps

The operation of the current supply stations and the movement of measurement stations is carried out independently and separately from the potential measurement stations. No communication exists between the two systems; each function continuously according to preset time intervals until its assigned measurement task is complete, at which point it powers down automatically. The current injection points are first deployed based on the selected powering mode described earlier. Each supply station is powered on, performs a self-check (including GPS signal verification), and is configured with operational parameters. Upon successful initialization, the coordinates of the current injection points A1B1 and A2B2 are recorded using GPS or other surveying tools. Once safety is confirmed, the supply process is initiated. The instrument system automatically logs time, current magnitude, and other relevant data. After each measurement cycle, the station is relocated to the next designated injection point, and the process is repeated.

The specific steps of the current supply measurement process are as follows:

S4: The current supply station first energizes the electrodes at current injection points A1 and B1. Simultaneously, all potential measurement stations P measure voltage differences across their connected electrodes. The supply station records the supply current $I_1$ at A1 and B1, and each potential station records the potential differences $$\Delta U^{(1)}_{M1N1} \text{ and } \Delta U^{(1)}_{M2N2}$$

across electrode pairs M1-N1 and M2-N2, respectively, corresponding to current injection at A1 and B1.

Next, the supply station energizes the electrodes at points A2 and B2. All potential measurement stations perform simultaneous measurements. The supply station records the supply current $I_2$ at A2 and B2, and each potential station records the potential differences $$\Delta U^{(2)}_{M1N1} \text{ and } \Delta U^{(2)}_{M2N2}$$

across electrode pairs M1-N1 and M2-N2, respectively, corresponding to current injection at A2 and B2.

S5: Based on the supply currents $I_1$ and $I_2$, and the spatial relationships between A1, B1, and point P, a first current density vector generated by A1 and B1 at P and a second current density vector generated by A2 and B2 at P are obtained. Using $$\Delta U^{(1)}_{M1N1} \text{ and } \Delta U^{(1)}_{M2N2}$$

along with the electrode spacing, the first electric field intensity vector generated by A1 and B1 at point P is derived. Using $$\Delta U^{(2)}_{M1N1} \text{ and } \Delta U^{(2)}_{M2N2}$$

along with the electrode spacing, the second electric field intensity vector generated by A2 and B2 at point P is derived;

S6: The first and second current density vectors and the first and second electric field intensity vectors are resolved within a common coordinate system to compute the apparent resistivity tensor.

The apparent resistivity tensor is computed using the following formula:

$$\overline{\rho} = \begin{bmatrix} \rho_{xx} & \rho_{xy} \\ \rho_{yx} & \rho_{yy} \end{bmatrix} = \frac{1}{j_x^{(1)} j_y^{(2)} - j_y^{(1)} j_x^{(2)}} \begin{bmatrix} E_x^{(1)} j_y^{(2)} - E_x^{(2)} j_y^{(1)} & E_x^{(2)} j_x^{(1)} - E_x^{(1)} j_x^{(2)} \\ E_y^{(1)} j_y^{(2)} - E_y^{(2)} j_y^{(1)} & E_y^{(2)} j_x^{(1)} - E_y^{(1)} j_x^{(2)} \end{bmatrix}$$

-continued $$j_X^{(1)} = \frac{I_1}{2\pi}\left[\frac{x_p - x_{A1}}{|r_{A1P}|^3} - \frac{x_p - x_{B1}}{|r_{B1P}|^3}\right]$$

$$j_Y^{(1)} = \frac{I_1}{2\pi}\left[\frac{y_p - y_{A1}}{|r_{A1P}|^3} - \frac{y_p - y_{B1}}{|r_{B1P}|^3}\right]$$

$$j_X^{(2)} = \frac{I_2}{2\pi}\left[\frac{x_p - x_{A2}}{|r_{A2P}|^3} - \frac{x_p - x_{B2}}{|r_{B2P}|^3}\right]$$

$$j_Y^{(2)} = \frac{I_2}{2\pi}\left[\frac{y_p - y_{A2}}{|r_{A2P}|^3} - \frac{y_p - y_{B2}}{|r_{B2P}|^3}\right]$$

$$E_x^{(1)} = E_{M1N1}^{x(1)} + E_{M2N2}^{x(1)} = \frac{\Delta U_{M1N1}^{(1)}}{|r_{M1N1}|^2} \cdot (x_{N1} - x_{M1}) + \frac{\Delta U_{M2N2}^{(1)}}{|r_{M2N2}|^2} \cdot (x_{N2} - x_{M2})$$

$$E_y^{(1)} = E_{M1N1}^{y(1)} + E_{M2N2}^{y(1)} = \frac{\Delta U_{M1N1}^{(1)}}{|r_{M1N1}|^2} \cdot (y_{N1} - y_{M1}) + \frac{\Delta U_{M2N2}^{(1)}}{|r_{M2N2}|^2} \cdot (y_{N2} - y_{M2})$$

$$E_x^{(2)} = E_{M1N1}^{x(2)} + E_{M2N2}^{x(2)} = \frac{\Delta U_{M1N1}^{(2)}}{|r_{M1N1}|^2} \cdot (x_{N1} - x_{M1}) + \frac{\Delta U_{M2N2}^{(2)}}{|r_{M2N2}|^2} \cdot (x_{N2} - x_{M2})$$

$$E_y^{(2)} = E_{M1N1}^{y(2)} + E_{M2N2}^{y(2)} = \frac{\Delta U_{M1N1}^{(2)}}{|r_{M1N1}|^2} \cdot (y_{N1} - y_{M1}) + \frac{\Delta U_{M2N2}^{(2)}}{|r_{M2N2}|^2} \cdot (y_{N2} - y_{M2})$$

$$|r_{A1P}| = \sqrt{(x_p - x_{A1})^2 + (y_p - y_{A1})^2}$$

$$|r_{B1P}| = \sqrt{(x_p - x_{B1})^2 + (y_p - y_{B1})^2}$$

$$|r_{A2P}| = \sqrt{(x_p - x_{A2})^2 + (y_p - y_{A2})^2}$$

$$|r_{B2P}| = \sqrt{(x_p - x_{B2})^2 + (y_p - y_{B2})^2}$$

$$|r_{M1N1}| = (x_{N1} - x_{M1})^2 + (y_{N1} - y_{M1})^2$$

$$|r_{M2N2}| = (x_{N2} - x_{M2})^2 + (y_{N2} - y_{M2})^2$$

Where: $(x_{A1}, y_{A1})$, $(x_{B1}, y_{B1})$, $(x_{A2}, y_{A2})$, $(x_{B2}, y_{B2})$ are coordinates of current electrodes A1, B1, A2, and B2, respectively; $(x_{M1}, y_{M1})$, $(x_{N1}, y_{N1})$, $(x_{M2}, y_{M2})$, $(x_{N2}, y_{N2})$ are coordinates of potential measurement electrodes; $(x_P, y_P)$ is the coordinate of potential measurement station P;

$$j_X^{(1)} \text{ and } j_Y^{(1)}$$

are the components of the first current density vector along the x and y axes, respectively;

$$j_X^{(2)} \text{ and } j_Y^{(2)}$$

are the components of the second current density vector along the x and y axes, respectively;

$$E_x^{(1)} \text{ and } E_y^{(1)}$$

are the components of the first electric field intensity vector along the x and y axes, respectively;

$$E_x^{(2)} \text{ and } E_y^{(2)}$$

are the components of the second electric field intensity vector along the x and y axes, respectively; $|r_{A1P}|$, $|r_{B1P}|$, $|r_{A2P}|$, $|r_{B2P}|$, $|r_{M1N1}|$, $|r_{M2N2}|$ are the components of the distance between both points, respectively.

The randomly distributed tensor resistivity measurement system described in the present invention includes multiple independent current supply stations and potential measurement stations. Each operates autonomously, using a built-in GPS clock to provide unified timing. Measurement data are recorded and stored sequentially according to GPS timestamps, and are later synchronized by time during post-processing to extract current or potential difference data corresponding to each measurement station at specific times.

In this embodiment, the current supply station includes a supply station host, four long-distance power cables, four to ten stainless steel or copper electrodes, a boost power supply, and either a generator or battery unit.

Figure 6:
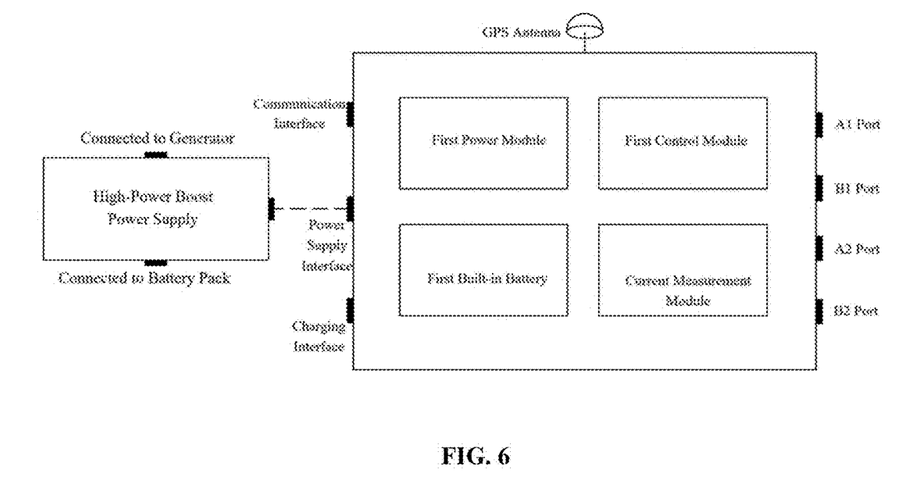
FIG. 6 is a schematic diagram of the current supply station host.

As illustrated in FIG. 6, the supply station host includes a first control module, a first power module, a first built-in battery, a current measurement module, and a first GPS module. The first control module serves as the core of the current supply station and is responsible for managing current electrode channel selection, power parameter configuration, external power source integration, internal power management, real-time current measurement, and synchronization of supply current data with GPS timing signals (time-stamping). It generates time-series current data and segments it into binary data files according to preset time intervals for storage. The file header contains information such as start and end times of current supply, supply station ID, channel ID, and associated electrode position coordinates.

The current measurement module, controlled by the first control module, uses an analog-to-digital conversion (A/D) circuit to measure and digitize the current values, which are then recorded and stored by the control system.

Under the control of the first control module, the first power module selects specific channels (A1, B1 or A2, B2) and connects them to the external boost power supply through the power interface to receive high-voltage DC input. The first power module also monitors the status of the built-in battery and manages the charging process.

The first built-in battery provides the necessary energy for long-term operation of the supply station and ensures minimal energy consumption for the system clock, memory, and essential chip operations during shutdown or standby.

The first GPS module consists of an external antenna and GPS control module, governed by the first control module. After successful system startup and self-check, it continuously transmits GPS codes to the host, providing real-time position and timing data. The host records these timestamps alongside the current measurements to support synchronized data processing.

The supply station host is designed with multiple functional interfaces: 1. Four power output ports for connecting to distant electrodes at A1, B1, A2, and B2 via long-distance cables to sequentially supply current underground. 2. A power input interface connected to the boost power supply for high-power, high-voltage DC input. 3. A charging port for recharging the internal battery. 4. A communication interface for exporting time-series supply current data recorded during field operations. This interface is also preconfigured to accommodate an external wireless communication module for future upgrades to support remote data transmission and telemetry control.

The boost power supply is a high-power DC output device with inverter and step-up capabilities. Its power output and configuration are determined according to the depth of the exploration. It may be powered either by connecting to a battery or battery pack for DC-to-DC step-up conversion, or through a generator using 220V AC step-up followed by rectification to DC.

The selection between a generator, battery, or battery pack is based on the required exploration depth (power needs) and surface terrain accessibility. Batteries and portable packs offer ease of mobility but are limited in power and duration. Generators provide a broader range of output power and runtime but are bulkier and more difficult to transport in rough terrain. The choice can be made flexibly depending on the surface conditions and exploration requirements.

Figure 7:
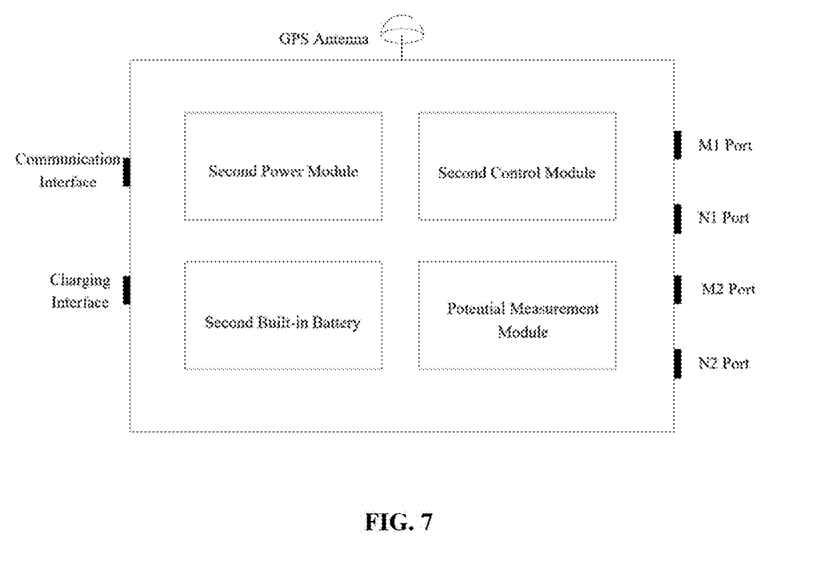
FIG. 7 is a schematic diagram of the potential measurement station host.

As shown in FIG. 7, the potential measurement station includes a station host, two to four potential measurement cables, and three to four non-polarizable electrodes.

The potential measurement station host includes a second control module, a second power module, a second built-in battery, a potential measurement module, and a second GPS module. The second control module functions as the core of the potential measurement station, managing channel selection for differential voltage measurements, measurement parameter configuration, internal power management, dual-channel voltage acquisition and storage, and synchronization of voltage data with GPS timing (time-stamping). It generates time-series potential difference data, segmented and stored as binary files at preset intervals. File headers include measurement start and end times, station ID, channel ID, and associated electrode coordinates.

Controlled by the second control module, the potential measurement module simultaneously acquires differential voltage data from two orthogonally arranged channels, which are then recorded and stored by the control circuit.

The second power module, under the control of the second control module, monitors the status of the built-in battery and manages the charging process.

The second built-in battery provides long-term operating power for the potential measurement station, and maintains minimum energy consumption for system clock, memory retention, and essential chip operation during shutdown or standby.

The second GPS module, composed of an external antenna and GPS unit, is controlled by the second control module. After a successful power-on self-test, it continuously transmits GPS codes to the control module, providing real-time position and timing data. This data is recorded along with voltage measurements to generate synchronized timestamps for post-processing.

The potential measurement station host is equipped with several functional interfaces: 1. Four potential measurement ports connect to remote electrodes at M1, N1, M2, and N2 via measurement cables, receiving potential difference data between electrode pairs. 2. A charging port for recharging the internal battery. 3. A communication port for exporting field-recorded, time-series potential difference data during post-processing. The communication interface is preconfigured to support a wireless communication module for future upgrades, enabling remote data transmission and telemetry control.

To perform inversion imaging of the subsurface within the survey area, the data from all current supply stations and potential measurement stations must first be collected. Using processing software, the four-channel voltage measurement data from each potential measurement station is extracted and synchronized with the corresponding current supply data from the supply stations based on timestamp alignment. By integrating the station IDs and spatial coordinates, the apparent resistivity tensor for each current-potential station combination is computed. These tensors are then used directly for inversion imaging, or alternatively, rotational invariants of the apparent resistivity tensors may be extracted and used for inversion to generate the final resistivity model of the subsurface.

Rotational invariants are typically extracted using the following two methods:

1. Based on a Combination of Three Independent Rotational Invariants

There are three independent rotational invariants (Determinant, RMS, and Trace) associated with the elements of the apparent resistivity tensor matrix. From these three rotational invariants, an infinite number of invariant sets can be derived and combined to characterize and evaluate the electrical properties of subsurface structures.

(1) Square Root of the Determinant:

$$\rho_\Delta = \sqrt{\Delta\rho} = \sqrt{(\rho_{xx}\rho_{yy} - \rho_{xy}\rho_{yx})}$$

(2) $\sqrt{2}$ Times the Root Mean Square (RMS):

$$\rho_{ssq} = \sqrt{\frac{(\rho_{xx}^2 + \rho_{xy}^2 + \rho_{yx}^2 + \rho_{yy}^2)}{2}} = \sqrt{2} \cdot RMS$$

(3) Average of the Trace:

$$\rho_{trace} = \frac{\rho_{xx} + \rho_{yy}}{2}$$

2. WAL Rotational Invariants

By decomposing the apparent resistivity tensor, it can be expressed as a combination of rotational invariants and variable components:

$$\overline{\rho} = \prod_1 \cdot \begin{bmatrix} \cos 2\alpha & \sin 2\alpha \\ \sin 2\alpha & -\cos 2\alpha \end{bmatrix} + \prod_2 \cdot \begin{bmatrix} \cos 2\beta & \sin 2\beta \\ -\sin 2\beta & \cos 2\beta \end{bmatrix}$$

Where:

$$\prod_1 = \frac{1}{2}\sqrt{(\rho_{xy} + \rho_{yx})^2 + (\rho_{yy} - \rho_{xx})^2}$$

$$\prod_2 = \frac{1}{2}\sqrt{(\rho_{yx} - \rho_{xy})^2 + (\rho_{yy} + \rho_{xx})^2}$$

$$\sin 2\alpha = \frac{\rho_{xx} + \rho_{yx}}{\sqrt{(\rho_{yx} + \rho_{xy})^2 + (\rho_{yy} - \rho_{xx})^2}}$$

$$\sin 2\beta = \frac{\rho_{xy} - \rho_{yx}}{\sqrt{(\rho_{yx} - \rho_{xy})^2 + (\rho_{yy} + \rho_{xx})^2}}$$

Where, $\prod_1$, $\prod_2$, and $\sin 2\beta$ are invariants. Referring to the WAL rotational invariants used in magnetotelluric impedance tensor analysis (which includes 7 parameters). The resistivity tensor of DC resistivity can reference and retain the three rotational invariants $I_1$, $I_3$, and $I_5$, which can be used for evaluating 1D, 2D, and 3D subsurface structure conditions.

(1) 1D Rotational Invariant $$I_1 = \prod_2 = \frac{1}{2}\sqrt{(\rho_{yx} - \rho_{xy})^2 + (\rho_{yy} + \rho_{xx})^2}$$

(2) 2D Rotational Invariant $$I_3 = \frac{\prod_1}{\prod_2} = \sqrt{\frac{(\rho_{xy} + \rho_{yx})^2 + (\rho_{yy} - \rho_{xx})^2}{(\rho_{yx} - \rho_{xy})^2 + (\rho_{yy} + \rho_{xx})^2}}$$

(3) 3D Rotational Invariant $$I_5 = \sin 2\beta = \frac{\rho_{xy} - \rho_{yx}}{\sqrt{(\rho_{yx} - \rho_{xy})^2 + (\rho_{yy} + \rho_{xx})^2}}$$

These invariants are typically used in combination for inversion and visualization. By eliminating directional dependencies inherent in conventional resistivity measurements, they improve map clarity, enable multi-parameter cross-validation, and enhance interpretation accuracy.

Figure 8:
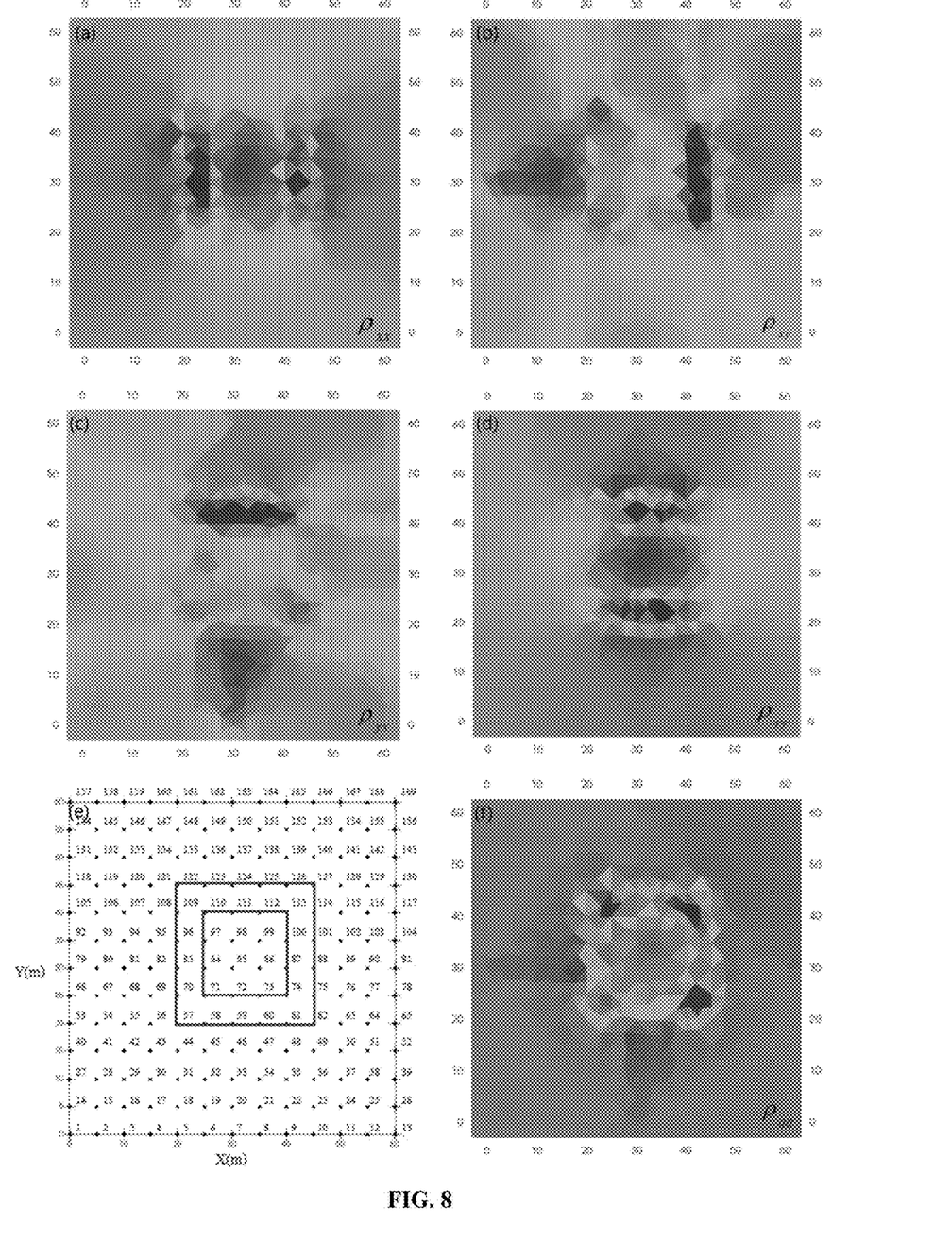
FIG. 8 is a numerical simulation comparison diagram between traditional scalar resistivity imaging results and imaging results obtained using the tensor resistivity method.

To validate the beneficial effects of the method proposed in this invention, numerical simulations and imaging were performed using both the conventional resistivity method and the tensor resistivity method of the present application. The results are shown in FIG. 8. In FIG. 8, (e) illustrates the model setup, which includes a square underground wall structure, with 13×13 electrodes evenly distributed along the X and Y directions around it. In the conventional resistivity method, measurements were taken by selecting current injection and potential difference measurement points along either the X or Y direction, followed by inversion imaging. This yielded four different imaging results. The $\rho_{xx}$ in (a) represents the imaging results of X-direction current and X-direction potential measurement. The $\rho_{xy}$ in (b) represents the imaging results of X-direction current and Y-direction potential measurement. The $\rho_{yx}$ in (c) represents the imaging results of Y-direction current and X-direction potential measurement. The $\rho_{yy}$ in (d) represents the imaging results of Y-direction current and Y-direction potential measurement. As evident from the imaging results, the conventional scalar resistivity method suffers from pronounced directional dependence. For example, X-direction current with X-direction potential measurement (ρxx) fails to clearly image wall boundaries along the Y direction and introduces false anomalies outside the Y boundaries. Similarly, Y-direction current with Y-direction potential measurement (ρyy) fails to resolve X-direction boundaries and produces false anomalies on the X periphery. The pxy and pyx configurations result in even more complex image distortions, boundary loss, and artificial anomalies. The (f) in FIG. 8 shows the imaging result obtained using the tensor resistivity method. The rotational invariants of the apparent resistivity tensor were extracted and used for inversion. The result shows a strong match with the true wall model, eliminates directional deficiencies, and effectively suppresses directional artifacts.

Figure 9:
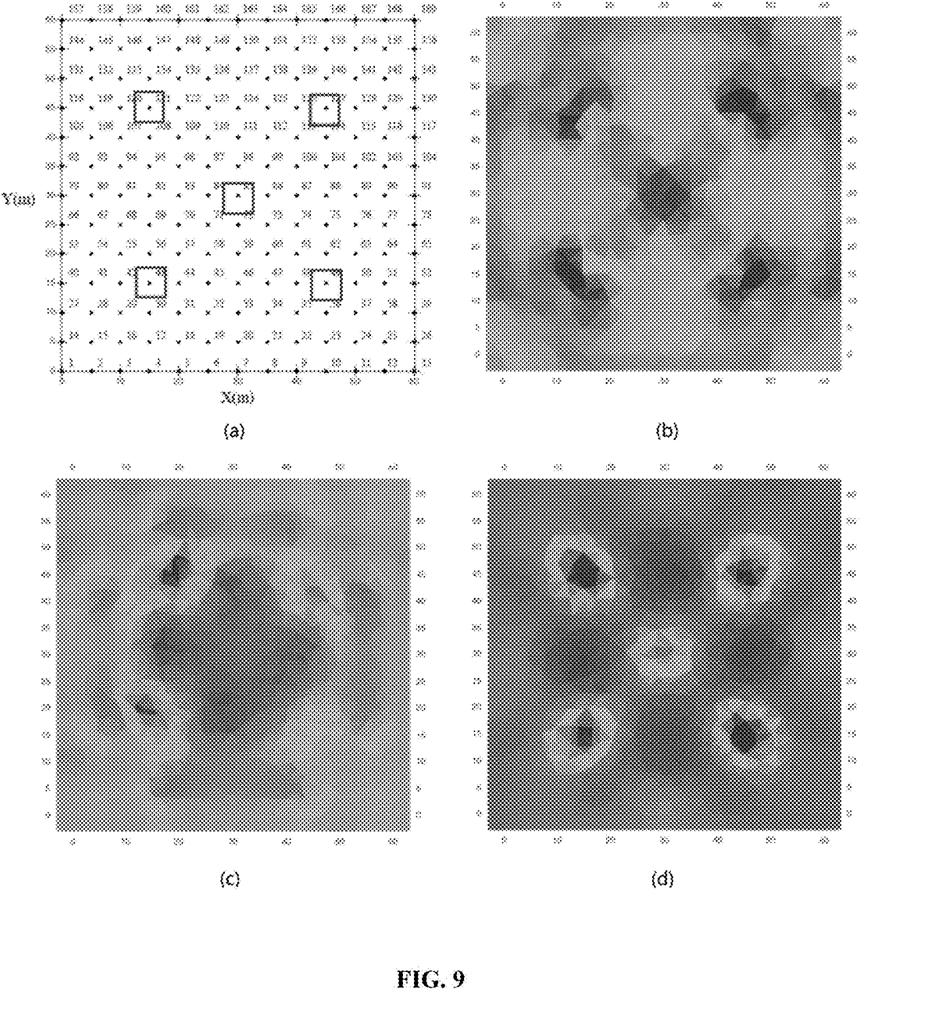
FIG. 9 is a comparison diagram of imaging results using the tensor resistivity method with different current electrode lengths.

FIG. 9 presents a comparison of numerical simulations using different current injection strategies. The (a) in FIG. 9 is a model setup with five small target bodies placed in the survey area, with grid-based electrode arrangement identical to that shown in FIG. 7. The (b) in FIG. 9 is an imaging result using the tensor resistivity method with current injected at single grid-node spacing. The five targets are not clearly resolved. The (c) in FIG. 9 is an imaging result using six-node spacing. The targets remain poorly resolved. The (d) in FIG. 9 is an imaging result with current injected from electrodes placed at twelve-node spacing (near the model boundary). All five targets are clearly resolved. Additional simulations with even greater spacing demonstrated that increasing the distance between current electrodes—through the use of external current injection points or combined external and internal injection schemes—significantly enhances imaging performance.

It will be understood by those skilled in the art that the above-described embodiments are merely preferred examples and are not intended to limit the scope of the invention. Although the invention has been described in detail with reference to these embodiments, modifications or equivalent replacements of the technical features disclosed herein are still possible. Any changes made within the spirit and scope of the invention shall be considered within the protection scope of the present application.

What is claimed is:

1. A randomly distributed tensor resistivity measurement method, comprising the following steps:
    S1: randomly arranging a plurality of potential measurement stations P across a survey area according to surface conditions to cover the entire survey area;
    S2: arranging four potential electrodes M1, N1, M2, and N2 around each potential measurement station P, wherein each potential measurement station P is equipped with a potential measurement unit, and a line connecting M1 and N1 intersects with a line connecting M2 and N2; a distance between M1-N1 and a distance between M2-N2 are defined as electrode spacing a, where a=(1/10-1/20) H, and H represents the exploration depth;
    S3: deploying a plurality of current injection points within the survey area; selecting any four of the plurality of current injection points as A1, B1, A2, and B2, and ensuring that the line between A1-B1 intersects with the line between A2-B2;
    S4: supplying power to electrodes at A1 and B1 using a supply station, while all electrodes at potential measurement stations P simultaneously performing potential measurement; the supply station recording a supply current $I_1$ of electrodes at A1 and B1, and each potential station measuring the potential differences $$\Delta U^{(1)}_{M1N1} \text{ and } \Delta U^{(1)}_{M2N2}$$

across electrode pairs M1-N1 and M2-N2, respectively, corresponding to current injection at A1 and B1; subsequently, supplying power to electrodes at A2 and B2, while all electrodes at potential measurement stations P simultaneously perform potential measurement; the supply station recording a supply current $I_2$ of electrodes at A2 and B2, and each potential station measuring the potential differences $$\Delta U^{(2)}_{M1N1} \text{ and } \Delta U^{(2)}_{M2N2}$$

across electrode pairs M1-N1 and M2-N2, respectively, corresponding to current injection at A2 and B2;
    S5: based on the supply currents $I_1$ and $I_2$, and the spatial relationships between A1, B1, and point P, obtaining a first current density vector generated by A1 and B1 at P and a second current density vector generated by A2 and B2 at P; using $$\Delta U^{(1)}_{M1N1} \text{ and } \Delta U^{(1)}_{M2N2}$$

along with the electrode spacing to derive the first electric field intensity vector generated by A1 and B1 at point P; using $$\Delta U^{(2)}_{M1N1} \text{ and } \Delta U^{(2)}_{M2N2}$$

along with the electrode spacing to derive the second electric field intensity vector generated by A2 and B2 at point P;
    S6: performing vector decomposition of the first current density, the second current density, the first electric field vector, and the second electric field vector in a common coordinate system to compute the apparent resistivity tensor.

2. The method of claim 1, wherein the survey area is first divided into multiple sub-areas before executing step S1, and steps S1-S6 are performed within each sub-area to complete the tensor resistivity measurement across the entire survey area.

3. The method of claim 1, wherein prior to step S1, dividing the survey area into multiple sub-areas; executing steps S1-S2 in each sub-area to arrange potential measurement stations P and potential measurement electrodes M1, N1, M2, N2;
    wherein the power supply arrangement and selection in step S3 are replaced by: arranging k internal current injection points in each sub-area, and l external current injection points around the perimeter; one of the k internal points is selected as point O, and two of the l external points are selected as A1 and A2, respectively; both B1 and B2 are coincided with point O;
    executing steps S4-S6 within each sub-area to complete the apparent resistivity tensor.

4. The method of claim 1, wherein prior to step S1, dividing the survey area into multiple sub-areas; executing steps S1-S2 to deploy potential measurement stations and electrodes in each sub-area;
    wherein the power supply arrangement and selection in step S3 are replaced by: deploying not fewer than four external injection points around each sub-area; selecting four of the external injection points as A1, B1, A2, and B2, with a line between A1 and B1 intersecting with a line between A2 and B2;
    executing steps S4-S6 within each sub-area to complete the apparent resistivity tensor.

5. The method of claim 4, wherein the external current injection points are distributed in all directions around each sub-area.

6. The method of claim 5, wherein eight external injection points are arranged around each sub-area, distributed in the east, west, south, north, southwest, northwest, southeast, and northeast directions.

7. The method of claim 1, wherein in step S2, the potential electrodes N1 and N2 are co-located with the measurement station P.

8. The method of claim 1, wherein current injection points B1 and B2 are co-located at point O, and the supply station is arranged at O.

9. The method of claim 1, wherein the spacing between adjacent potential measurement stations is 2-3 times the electrode spacing, and the spacing between adjacent current injection points is 3-5 times that of adjacent potential measurement stations.

10. A randomly distributed tensor resistivity measurement system, comprising a plurality of current supply stations and potential measurement stations;
- wherein each current supply station comprises a supply station host, long-distance power cables, current injection electrodes, and a boost power supply;
- the supply station host comprises a first control module, first power module, first built-in battery, current measurement module, and first GPS module;
- the first control module is configured to control electrode channel selection, power parameter configuration, external power supply integration, internal power management, current measurement, GPS timing, and synchronization of current data into a time series stored at preset intervals;
- the current measurement module is configured to digitize the current values through an A/D converter;
- the first power module is configured to select specific supply channels and connects to the boost power supply;
- the first built-in battery is configured to supply long-term operating power;
- the first GPS module, with an external antenna, is configured to provide location and time data to the host;
- the host is configured to provide four power output ports connected via long-distance cables to current electrodes at points A1, B1, A2, and B2 for sequential power delivery underground;
- each potential measurement station comprises a station host, potential measurement cables, and electrodes;
- the host comprises a second control module, second power module, second built-in battery, potential measurement module, and second GPS module;
- the second control module is configured to control channel selection, measurement settings, power management, dual-channel acquisition, and GPS-synchronized time-stamped data storage;
- the potential measurement module is configured to acquire differential voltage from two orthogonal channels simultaneously;
- the second power module is configured to manage the internal battery condition and charging;
- the second built-in battery is configured to ensure long-term operation and essential standby functions;
- the second GPS module, with an external antenna, is configured to provide location and clock data to the host;
- the host comprises four measurement ports connected via cables to electrodes at M1, N1, M2, and N2 to receive potential difference signals between electrode pairs.

* * * * *